(12) United States Patent
Aleksander et al.

(10) Patent No.: US 7,080,321 B2
(45) Date of Patent: Jul. 18, 2006

(54) DYNAMIC HELP OPTION FOR INTERNET CUSTOMERS

(75) Inventors: Szlam Aleksander, Alpharetta, GA (US); Thomas R. Buiel, Atlanta, GA (US); Kirk L. Somers, Alpharetta, GA (US); Charles L. Warner, II, Decatur, GA (US)

(73) Assignee: Aspect Software, Inc., Westford, MA (US)

( * ) Notice: Subject to any disclaimer, the term of this patent is extended or adjusted under 35 U.S.C. 154(b) by 387 days.

(21) Appl. No.: 09/885,717

(22) Filed: Jun. 20, 2001

(65) Prior Publication Data
US 2002/0047859 A1 Apr. 25, 2002

Related U.S. Application Data

(60) Provisional application No. 60/213,378, filed on Jun. 23, 2000.

(51) Int. Cl.
 *G06F 3/00* (2006.01)
(52) U.S. Cl. .................. 715/708; 715/707; 715/705
(58) Field of Classification Search ............. 715/708, 715/707, 705, 706, 709, 710, 711, 712, 713, 715/745, 760, 977, 501.1, 513, 108
See application file for complete search history.

(56) References Cited

U.S. PATENT DOCUMENTS

| | | | | |
|---|---|---|---|---|
| 5,185,782 A | * | 2/1993 | Srinivasan | 379/210.01 |
| 5,239,617 A | * | 8/1993 | Gardner et al. | 706/11 |
| 5,933,140 A | * | 8/1999 | Strahorn et al. | 345/712 |
| 6,178,439 B1 | * | 1/2001 | Feit | 709/200 |
| 6,256,620 B1 | * | 7/2001 | Jawahar et al. | 707/2 |
| 6,262,730 B1 | * | 7/2001 | Horvitz et al. | 345/707 |
| 6,356,283 B1 | * | 3/2002 | Guedalia | 345/760 |
| 6,584,496 B1 | * | 6/2003 | Ludtke | 709/217 |

* cited by examiner

*Primary Examiner*—Kieu D. Vu
(74) *Attorney, Agent, or Firm*—Bourque & Associates, P.A.

(57) ABSTRACT

The invention determines when an Internet browsing customer should be provided assistance by monitoring factors such as the customer profile saved at the server or in cookies, the time a customer spends on particular web pages, errors in forms submitted by the customer, web pages repeatedly viewed by a customer, and statistically established abandon points. When the invention determines a customer should be provided assistance, the invention reviews the availability and probability of availability of the customer service representatives (CSRs). If a CSR is available or predicted to be available, the customer is presented with a HELP option. If the customer does not respond to the HELP option within a predetermined time, the HELP option is removed. By dynamically determining the appropriate time to provide a HELP option and only providing the HELP option when a CSR is available, the invention proactively provides meaningful service at the critical time.

31 Claims, 8 Drawing Sheets

DYNAMIC HELP OPTION FOR INTERNET CUSTOMERS

PRIORITY CLAIM

This patent application claims the priority of U.S. Provisional Patent Application Ser. No. 60/213,378 filed Jun. 23, 2000.

TECHNICAL FIELD

The present invention is related to Internet web sites and to customer assistance, and more particularly to dynamically providing a HELP option for assistance to customers.

BACKGROUND OF THE INVENTION

When a person (referred to herein as a "customer") visits a web site of a company that person, depending upon the skill level of that person, may find it easy to navigate that web site and obtain the desired information for a product or a service, or place an order for a product or a service, or that person may find it difficult or impossible to obtain the desired information or place an order.

Many web sites have a "HELP" button, which allows the customer to "click on" or press that button in order to contact a customer service representative ("CSR") of the company. In some cases, that button brings up an e-mail screen whereby the customer can send an e-mail message to the CSR. However, the customer must then wait for a reply from the CSR, which can take minutes, hours, or days. In other cases, that button directly connects the customer to the CSR via a web page, so that the customer and the CSR can communicate with each other in real time by simply typing messages on the screen, which both parties (the customer and the CSR) can view simultaneously. However, if all of the customer service representatives are busy, then the customer may have to wait for some time before a reply appears on the screen. During this time, the customer may lose interest or just become tired of waiting, and then disconnect or switch to another web site, such as a competitor's web site.

This problem becomes particularly acute if all customer service representatives are normally occupied and a customer is repeatedly not able to communicate with a CSR. This results in a customer who has not been able to obtain the desired information, or who has not been able to place an order, and who is dissatisfied with the service he or she has received. Thus, not only is a potential sale lost to the company but, depending upon the degree of dissatisfaction of the customer, that particular customer may be forever lost to the company.

Further, even when having difficulty obtaining the desired information or placing an order, some customers are reluctant to press a HELP button, especially when pressing the HELP button merely brings up an e-mail message screen, or brings up a screen requiring the customer to provide a large amount of information.

Therefore, service to the customer would be improved if pressing the HELP button quickly connected the customer to a CSR.

In addition, service to the customer would be improved if it could be automatically determined if the customer was having a problem and needed assistance.

In addition, service to the customer would be improved if the customer was automatically connected to a CSR when the customer was having difficulty obtaining the desired information or placing an order.

SUMMARY OF THE INVENTION

The present invention provides for connecting a customer to a CSR when the customer presses a HELP button, especially when the customer should be offered assistance and when the company can offer assistance. The CSR may communicate with the customer via various media including, but not limited to, electronic chat, e-mail, multi-media/presentation form exchanges, voice over Internet Protocol (VoIP), voice over Public Switched Telephone Network (PSTN) and fax.

The present invention provides for automatically determining whether the customer should be provided assistance. In addition, the present invention provides for automatically connecting a customer to a CSR when a CSR is available or is predicted to be available within an acceptable time.

The present invention provides assistance to a customer at a web site by receiving a request for a web page from a customer, sending the web page without a HELP option to the customer, automatically determining if the customer should be provided assistance and, if the customer should be provided assistance, then sending a HELP option to the customer. The present invention automatically determines if the customer needs assistance by monitoring factors such as the customer profile saved at the server, the customer preferences or other information contained in cookies on the customer's device, the time a customer spends on particular web pages, errors in forms submitted by the customer, web pages repeatedly viewed by a customer, and statistically established abandon points.

The invention may rely on information saved on a company server to determine when a HELP option should be provided to a customer. The company determines the identity of a customer via log-on information or cookies. Based on the identity of the customer, a determination can be made as to when (or even whether) to provide assistance. For example, if the customer is a VIP (Very Important Person) a HELP option may be presented as soon as possible. Alternatively, if the customer is a VIP who prefers self-help, a HELP option may not be sent at all, or a HELP option may be sent even though a CSR is not readily available because it is unlikely that the customer will request assistance from a CSR. The provision of assistance can be customer specific, on a case by case basis, based on the underlying customer profile.

The present invention may determine that a customer needs assistance through the use of cookies. A cookie is embedded in a web page so that when the web page is accessed by a customer for the first time, a cookie is sent to the customer's device. Then, when the customer accesses the web site in the future, the cookie is sent to the web host. Whenever predetermined web pages are opened by the customer, the cookie notifies the server of the identity of the customer. Further, the cookies may hold additional information about the customer including, for example, part or even all of the customer profile. This method is beneficial in that it frees up space on the company server as the customer profiles are maintained by the customers in cookies on their own devices or computers, not on the company server. Further, the use of cookies can be expeditious in that the company web server need not access another company server (perhaps geographically remote from the company web server) to obtain the customer information.

The present invention automatically determines that a customer should be provided assistance if the customer spends an inordinate amount of time on a particular web page or an area on a web page. The time a customer spends on a web page is measured with the use of a heartbeat embedded in the web page sent to the customer. The heartbeat periodically sends a message to the web site server or "pings" the web server. The time a customer spends on the web page may be measured by counting the number of the messages from the heartbeat, or other available factors such as keyboard entries, clicks, etc.

The present invention may determine that assistance should be provided by watching for errors in forms submitted by the customer. This may be done by a company server or at the customer's device by a java script, active X control, or applet (a mini-application) running thereon. At the server level, when a form is submitted by the customer, it is reviewed for errors. If errors of a sufficient import are found the invention determines it should provide assistance. At the customer level, when the customer submits the form, the form has a mini-application within it that processes the form and determines if there is an error of sufficient import for provision of assistance. If assistance is to be provided, the mini-application notifies the company server.

The present invention further provides for automatically determining if the customer needs assistance by counting the number of times that a customer returns to the web page; if the number exceeds a predetermined number then the customer should be provided assistance.

The present invention may rely on one or more abandon points to determine if it should provide assistance. Abandon points are web page locations where a determination, either dynamically or statically, has been made that there is a high likelihood that a customer will leave the company web site after visiting that page, rather than going on to another page on the web site. This dynamic or statistical determination may be based on, for example, prior and/or current customer interactions Thus, when a customer reaches an abandon point, assistance or at least an offer of assistance is sent to the customer in an effort to prevent the customer from leaving the company web site.

The present invention may also rely on prioritization to determine when to send assistance. A priority customer should get assistance before other customers. One may be a priority customer because of past purchasers, VIP status, or the type of transaction currently contemplated. For example, a customer would be a priority if she intended to purchase over a certain threshold of goods or services, or if she intended to purchase a particularly expensive item or service. The parameter for prioritization may be determined by the company dynamically based on the availability of agents and other statistics or statically based on historical information.

When the present invention determines assistance is needed, the present invention provides for sending the HELP option to the customer by sending an insert into the current web page, resending the current web page with a HELP button inserted, or sending a new web page to the customer that includes a HELP option. The HELP option need not be a single button, but rather may be composed of numerous HELP buttons distributed throughout a page or area.

Additionally, the present invention determines whether a customer service representative is available (or is predicted to be available within a certain time period), and if the customer service representative is not available then the step of sending the HELP option to the customer is delayed until a customer service representative is available. Further the estimated time before a customer service representative will be available can be determined, and if the estimated time exceeds a predetermined time then the step of sending the HELP option is delayed until the estimated time does not exceed the predetermined time.

The present invention further provides for determining the predetermined time based upon measurements of the time between the time that a HELP option was sent to a previous customer and the time that the previous customer responded to the HELP option. The present invention further provides for measuring the time since the HELP option was sent to the customer, and, if the time since the HELP option was sent has exceeded a predetermined response time without a response from the customer, then withdrawing the HELP option. The predetermined response time can be a static time set by the company, a dynamic real-time average time based on various criteria, a predicted time based on various criteria, or a time based on a pacing algorithm, such as or similar to those used in call centers, such as call centers sold by eShare Communications, Inc., Norcross, Ga. The HELP option may be withdrawn by removing the insert or sending another web page that does not having the HELP option. If the HELP option is withdrawn, then any assigned agent is then made available for another customer.

The present invention also provides for sending assistance to a customer at a web site by receiving a request for a web page from a customer, determining whether a customer service representative is available, and if the customer service representative is available then sending the web page to the customer with a HELP option on the web page and, optionally, reserving an agent to provide assistance. Additionally, if the customer service representative is not available, an estimated time before a customer service representative will be available may be predicted, and if the estimated time is less than a predetermined time then the web page is sent to the customer with a HELP option on the web page. The predetermined time may be calculated based upon the factors, or by using the methods, mentioned above. The present invention further provides for measuring the time since the HELP option was sent to the customer, and if the time since the HELP option was sent has exceeded a predetermined response time without a response from the customer, then removing the insert or sending another web page to the customer this web page not having the HELP option. The predetermined response time can be a static time set by the company, a dynamic real-time average time based on various criteria, or a predicted time based upon the factors, or by using the methods, mentioned above.

The present invention also provides for providing assistance to a customer at a web site by receiving a request for a web page from a customer, determining whether a customer service representative is available, predicting an estimated time before a customer service representative will be available, and if the estimated time is less than a predetermined time then sending the web page to the customer with a HELP option on the web page. The present invention further provides for determining the predetermined time based upon the factors, or by using the methods, mentioned above.

The present invention further provides for measuring the time since the HELP option was sent to the customer, if the time since the HELP option was sent has exceeded a predetermined response time without a response from the customer, then removing the insert or sending another web page to the customer this web page not having the HELP option.

The present invention further provides that the predetermined response time is determined based upon measurements of the times between the time that a HELP option is sent to previous customers and the time that the previous customers responded to the HELP option.

The present invention also provides for varying predicted agent availability and predicted times for customers to respond to a HELP offer based upon the web page whereat the issue arises. Therefore, different pages, and different areas within the same page, may affect the determination to provide assistance and the time that the assistance remains available.

DETAILED DESCRIPTION

Figure 1:
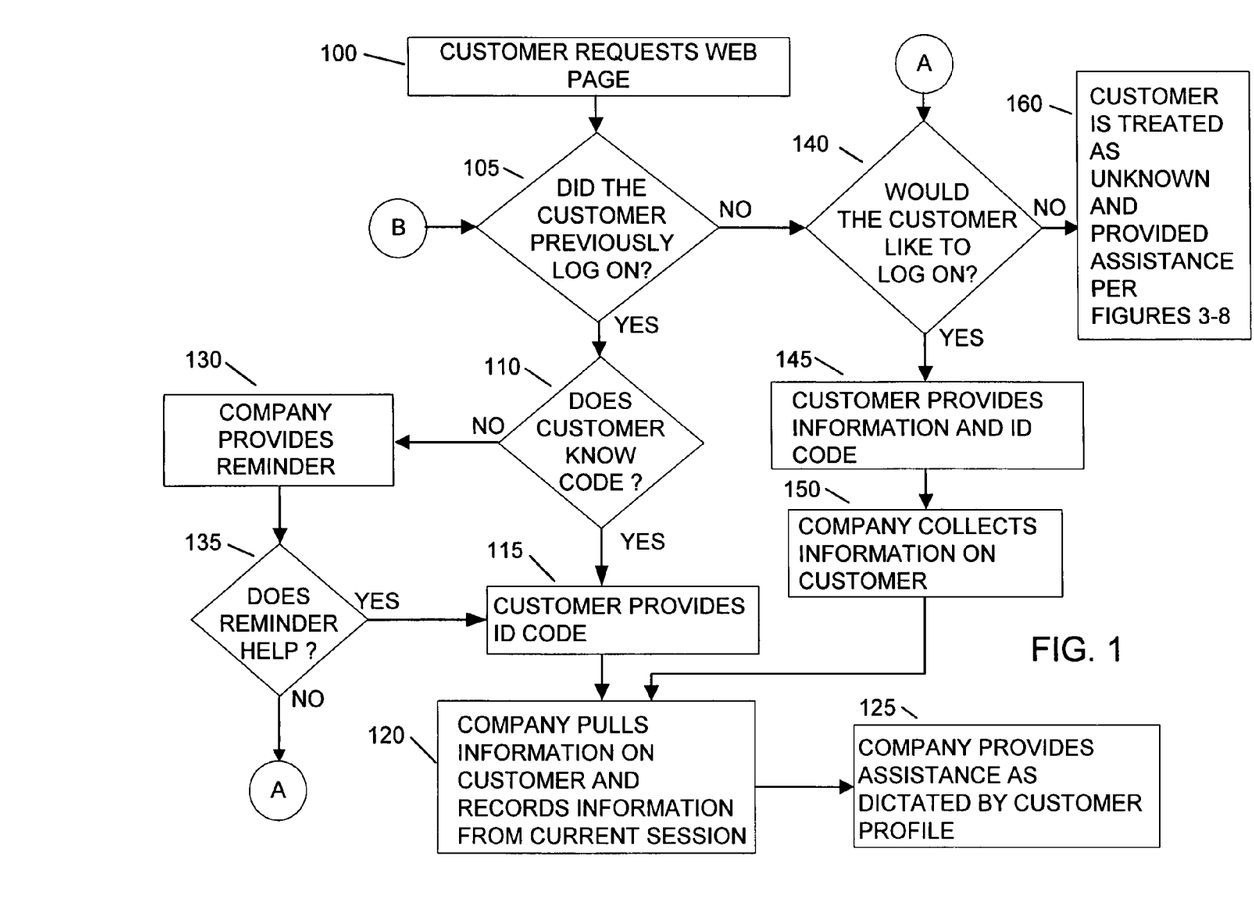
FIG. 1 illustrates a method of identifying and handling the customer based upon information provided directly by the customer.
Figure 2:
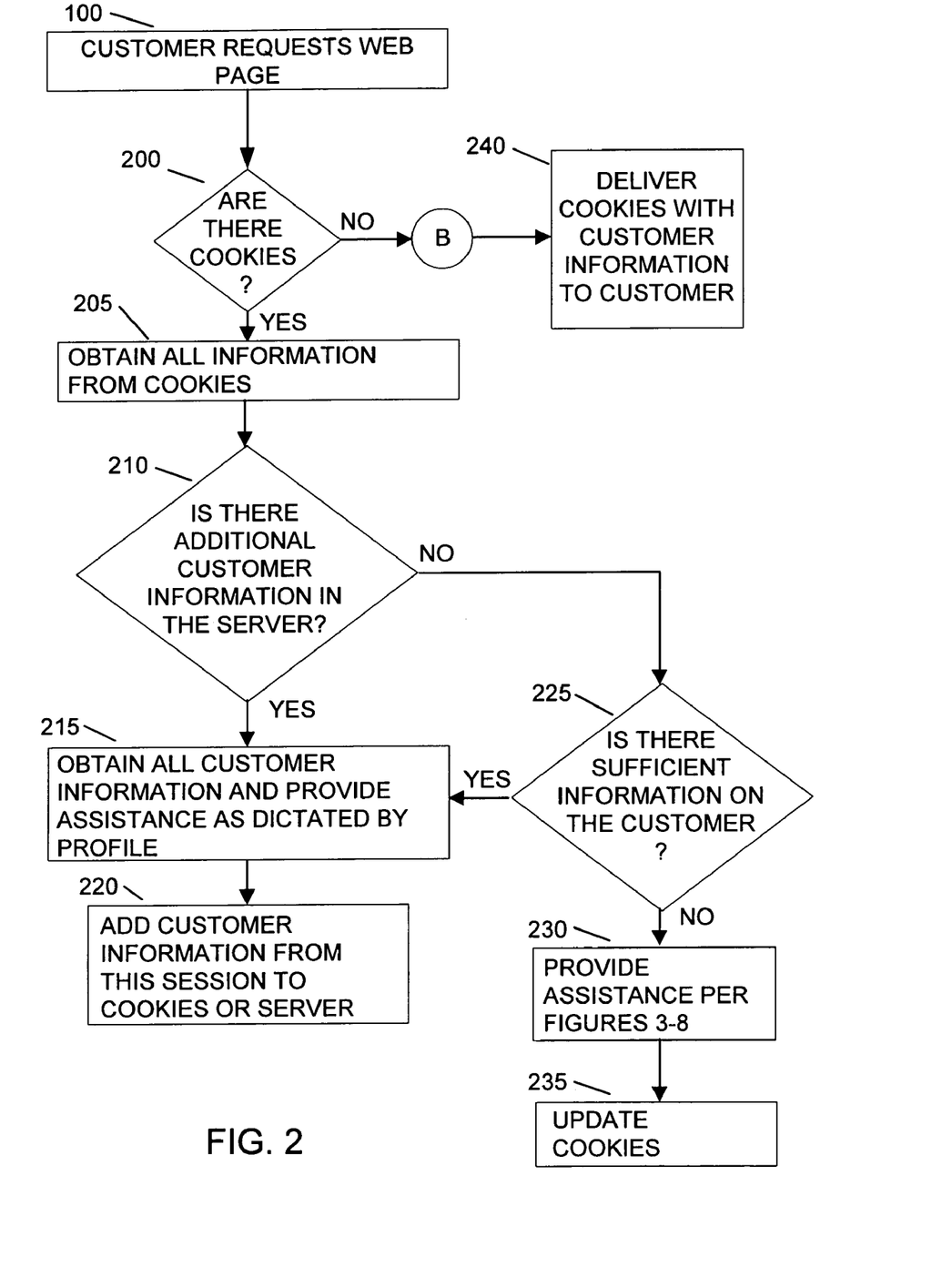
FIG. 2 illustrates a method of identifying and handling the customer based upon information contained in a cookie.

FIGS. 1–8 are flow charts illustrating various methods and steps of performing the present invention. FIGS. 1 and 2 illustrate methods of determining the identity of the customer. FIGS. 3–8 illustrate methods of determining whether and when and how long to provide HELP assistance to the customer.

Assistance is offered by inserting a HELP option within the web page, sending a new web page to the customer with a HELP option, or refreshing the existing web page and adding a HELP option. The HELP option may be static, or may be flashing, or may start in one state and then switch to the other state after a predetermined or predicted amount of time, or may alternate between the various states. Assistance may also be offered by sending a new web page to the customer which presents a screen and entry or interaction area whereby the customer may directly communicate with a customer service representative (CSR) via an Internet one-on-one chat. Additionally, the HELP option may allow the customer to select the media such as VoIP, voice over the PSTN, e-mail, fax, or other media or multi-media presentation for exchanges.

If assistance should be provided, a determination is made whether an agent is available, or is predicted to be available in an appropriate time, should the customer request help. This is preferably done prior to providing the HELP option. This is to avoid the prior art situations where the web page is always sent with a HELP button so that when a customer presses a HELP button nothing happens, or nothing happens for a long time. This determination is made using statistics gathered on CSR performance and customer activity.

FIG. 1 illustrates a method of identifying and handling the customer based upon information provided directly by the customer. The process starts 100 when a customer requests a web page from the company's web server. At this point, the company begins the process of determining whether or not the customer should be provided assistance by first attempting to identify the customer.

In FIG. 1, the decision whether to offer assistance is based on log-on information provided by the customer. At step 100, the customer requests a web page from the company web server. Decision 105 determines whether the customer needs to log-on as a new customer or an existing customer by asking the customer if she has previously logged-on to the web site. If the customer has previously logged-on, the customer will be asked to provide her identification (ID) code or other identifying information at step 110. The ID code is not necessary but is preferred for security. The ID code may be the customer's name, account number, or any other combination of ASCII characters or other characters or codes which are recognized by the web site server. At step 115, the customer provides her identification code. This code is used to access the customer's profile at step 120. In addition, at step 120, information pertaining to the current session is recorded. At step 125, assistance is provided (or not) based on the customer's profile.

At step 110, if the customer was unable to remember her identification code, then at step 130 a hint is provided to the customer. The hint is some word or code designated to be a hint and provided by the customer when she previously logged-on. If at step 135 the hint is sufficient to remind the customer of her identification code then the customer proceeds to step 115 and provides the ID code.

At step 135, if the customer is still unable to remember her identification code, she is asked to log on as a new customer at step 140.

At step 105, if the customer has not previously logged on, then the customer is asked to log on as a new customer at step 140.

If the customer chooses to log-on as a new customer, then at step 145 she is asked to provide, and she provides, her personal information. She also is provided, or is asked to create, her own identification code. At step 150, this information provided by the customer is stored in a customer profile for that customer. Step 120 will then be executed.

If at step 140 the customer refuses to log-on, then at step 160 she is treated as an unknown customer and provided assistance as determined by the methods disclosed below.

At step 145, the customer enters personal information about herself, such as her name, a personal identification code, or other identifying information. This information may be, as indicated above, any combination of letters, numbers, codes, and/or symbols unique to the customer. The amount of information provided may vary. The identification code is optional and provides a level of security when utilized. The personal identification code is used to identify the customer throughout the present session and in subsequent transactions. The information entered by the customer as well as information gained by the server throughout the course of the session is saved on the server. Every time the customer returns to the web site the customer file maintained by the server is updated with additional information. Thus, when the customer logs-on, the server reviews the customer file and, based on the information contained therein, determines when best to offer assistance to the customer.

For example, if the customer immediately requested assistance during past sessions, or if the customer is a Very Important Person or Very Important Customer (VIP or VIC), assistance may be immediately provided or offered to the customer. On the other hand, if the customer file indicates that the customer prefers self-help, assistance may not be provided or offered unless requested. Thus, the determination of whether or not to provide or offer assistance can be based on the customer file. Such customer files are well known in the art and can be used to predict the needs of the customer.

In FIG. 2, the invention determines when to send assistance based upon cookies stored in the customer's device. Cookies are well known in the art and are packets of information sent by the company's server (during a previous interaction) to the customer's browser and are maintained on the customer's device. Every time the customer accesses the company's server, the information maintained in the cookies is sent back to the server. This information in the cookies can then be used to determine when to provide assistance to the customer.

FIG. 2 illustrates a method of identifying and handling a customer based upon information contained in a cookie. At step 100, the customer requests a web page from the company web server. The web server requests the customer's device to send a cookie and waits 200 for a reply. If the customer's device sends a cookie then, at step 205, the server obtains all the available information on the customer from the cookie or cookies. The server then, at step 210, searches its own or linked databases to determine if there is more information on the customer. If there is additional information, then, at step 215, the server obtains all the available information and provides assistance as dictated by the customer information. At the end of the session with the customer or at some point during the session, the cookies and/or server are updated with information learned from the current session, as shown in step 220.

If at step 210 there is no further information available, that is, the information available on the customer is only the information provided by the cookies, then at step 225 the server determines whether there is sufficient information on the customer upon which to base decisions regarding the provision of assistance to the customer. If there is sufficient information, then step 215 is performed. If there is not sufficient information, then the server makes decisions regarding the provision of assistance to the customer as shown in FIGS. 3–8. At the end of the session with the customer or at some point during the session, the cookies and/or server are updated with information learned from the current session, as shown in step 235.

By way of example, but not of limitation, the cookie may reveal the customer prefers immediate assistance or is a VIP, so that assistance is offered or provided immediately. Alternatively, if the cookies reveal that the customer prefers self-help, assistance may not be provided unless and until the customer specifically requests assistance, and then assistance may be provided immediately. The cookies may be used to store simple, specific information such as the customer identification code that is then used by the invention to pull the customer file from the server database or linked databases. The cookies may also contain more data about the customer, even to the point of obviating the need to store information about the customer on the server. As with the customer file maintained on the server, the cookies may be constantly updated with every interaction between the customer and the company server so that the cookies holds the most complete and up-to-date information about the customer.

Finally, if there are no cookies at step 200, the server can go through the steps disclosed in FIG. 1, beginning at step 105. At the end of the session with the customer or at some point during the session, the server is updated with information learned from the current session, and a cookie is sent to the customer's device, as shown in step 240.

Figure 3:
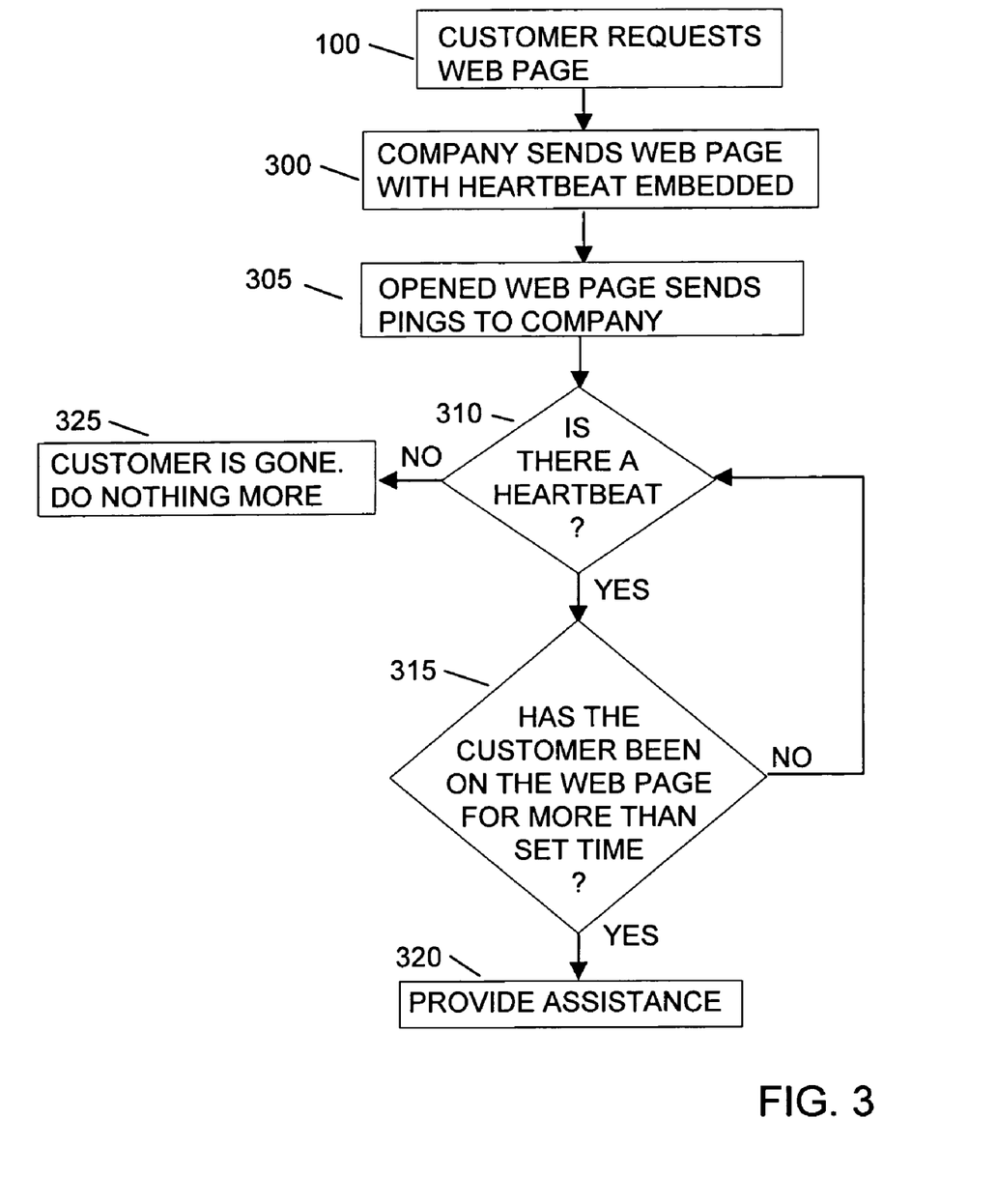
FIG. 3 illustrates a method of determining whether a customer needs assistance by monitoring a "heartbeat".

FIG. 3 illustrates a method of determining whether a customer needs assistance by monitoring a "heartbeat". The program and delivery of a "heartbeat" is well known in the art. A heartbeat is a small program running on the customers device, a mini-application. A "heartbeat" may be generated by java script, active X, an applet, or other similar language embedded in the hypertext mark-up language ("HTML") of the company's web page. A heartbeat causes the customer's device to periodically send a "ping" to a specified Internet address, such as a specific Internet address at the company. Essentially, the "heartbeat" is generated by a small program running within the browser running on the customer's device. The "heartbeat" is used to determine if a customer is still on a particular web page and how long that customer has been on that web page. Similarly, a server can monitor activity of the customer by measuring the time between key strokes or mouse clicks, or other such customer activity.

At step 100, the customer requests a web page from the company. The company sends the requested web page at step 300 with a heartbeat embedded in the page. At step 305, the opened web page at customer's device begins to send pings to the company. The company periodically checks to determine if there is still a heartbeat from the customer at step 310. If more than a predetermined number of heartbeat(s) are not received or a time-out occurs, then a determination is made that the customer has left the web page. Therefore, at step 325 the company does nothing further with this customer.

If, at step 310, there is a sufficient heartbeat then the company counts the number of pings. Periodically, at step 315, a determination is made as to whether the customer has been on the same page for at least a predetermined time (or at least a predetermined number of pings). If the number of pings is not at least the predetermined number of pings, the company continues to monitor the heartbeat at step 310. If, at step 315, the customer has been at the same web page for at least the predetermined amount of time, then the customer would appear to need assistance so, in step 320, assistance is offered or provided to the customer.

The ping is preferably sent frequently, such as once every five seconds, but may be sent more or less frequently. Causing a ping to be sent more frequently occupies more of the company web server time, and could slow down performance if a large number of customers are viewing the company web site. Conversely, causing a ping to be sent infrequently provides less reliable information about whether the customer is still viewing the same web page or has moved to another web page or another web site.

Alternatively, the heartbeat can be set-up to send a ping after a specified time interval, or every specified time interval, such as 30 seconds, and assistance, or an offer of assistance, will provided to the customer when the first ping is received by the server.

A "ping" preferably contains the originating address, that is, the current, permanent, or dynamic Internet address of the customer's device, so as to identify the source of the ping. The customer's device may be one of many types such as, but not limited to, a personal computer, a cellular phone, a palm top, a laptop, an IP phone, a pager, an IP pager, etc.) However, in one embodiment, the company web server assigns a different ping address to each session with the customer, so that the ping address used by an applet, active X, java script, etc., heartbeat generator at one customer browser is different than the ping address sent by a heartbeat sent by another customer browser to the server. A correlation table is then kept to associate the specific ping address with a particular customer's IP address. In this embodiment, sending the Internet address of the customer as part of the ping is optional. Additionally, the heartbeat transmission from a customer browser may be linked to cookies or server stored customer profiles so that the company can determine the source of the heartbeat with that customer information. This may be necessitated by the fact that many Internet Service Providers ("ISP's") utilize dynamic IP addresses and assign a different IP address to each new session initiated by a customer.

If a customer is having trouble at a web site, then the customer will typically spend a large amount of time at one web page or an area within a web page. For example, the customer may be completing a form to place an order. Step 315 tests whether the customer has been at the same web page for some predetermined amount of time, such as "X" minutes. This is determined by counting the number of pings from that customer. For example, using a ping rate of once per second, if the company web server has received 30 pings, then the customer has been on the same web page for 30 seconds, 60 pings means 1 minute, etc.

Preferably, if a predetermined number of pings is missed, such as 5 pings, then it is determined that the customer has moved to another web page or site (steps 310 and 325). The predetermined number of missed pings is arbitrary. If the number is too small, then a simple misrouting of a ping may end the counting. If the number is too large, then the information will be less reliable about whether the customer is still viewing the same web page or has moved to another web page or another web site.

In another embodiment, not illustrated, a heartbeat is not used. Rather, the company Internet server determines how long a customer has been on a web page. The server tracks the time between requests for additional web pages and determines that assistance should be provided when the time since the last request exceeds a predetermined time for that customer or that web page. This embodiment is less precise because it is difficult to determine when a customer has simply left the web site, but this embodiment reduces the inbound traffic to the server.

Figure 4:
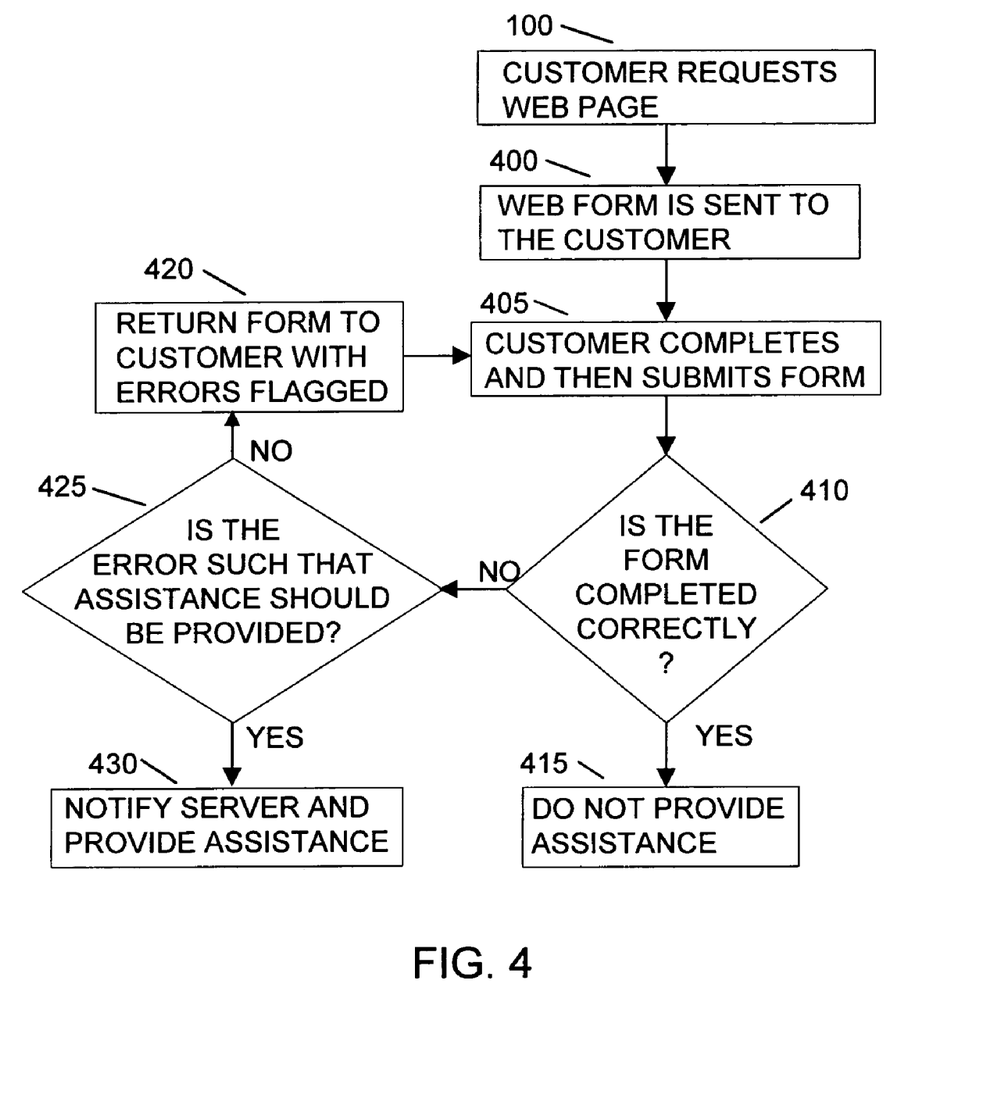
FIG. 4 illustrates a method of determining whether a customer needs assistance based upon mistakes by the customer in completing an electronic form found on the company web site.

FIG. 4 illustrates a method of determining whether a customer needs assistance based upon mistakes by the customer in completing an electronic form found on the company web site. The electronic form may be any field on any web page wherein the customer needs to enter any information or perform any activity. These forms may be validated by a java script or similar mini-application running on the customer's browser or by the company's server. Utilizing the mini-application is generally preferable because it is quicker since the validation is completed on the customer's device and there is no need to transmit incorrect information to and from the company's server.

At step 100, the customer requests a web page from the company server. The company responds at step 400 by sending a web form or web page with "clickable" fields or areas, or a web page with user selectable fields (electronic form), to the customer. The customer completes and submits the form, as indicated by step 405. At step 410 the form is checked for completeness of required fields and formalities. In validating the form completed by the customer, the application running on the browser or company's server looks for standard, non-customer specific errors. For example, the validation process may check that the appropriate number of digits are input for a credit card number, check that all the necessary blanks are filled-in, check that there are only numbers in the "quantity" field or only letters in the "State" field, etc. If there is an error or an omission of required information, the validating process determines whether it is appropriate to provide assistance to the customer. The company can predetermine the type of error that will allow the provision of assistance. For example; leaving a required field blank may not require assistance but simply a reminder note that the field must be completed. Decision 425 tests whether the error is of the type that assistance should be provided. If the error is not of the type sufficient to justify assistance, then, at step 420, the form is sent back to the customer with the errors flagged for the customer to re-submit the form. If, at step 425, the errors are of the type which indicate that assistance should be provided, then, at step 430, the company server is notified and assistance is provided.

Figure 5:
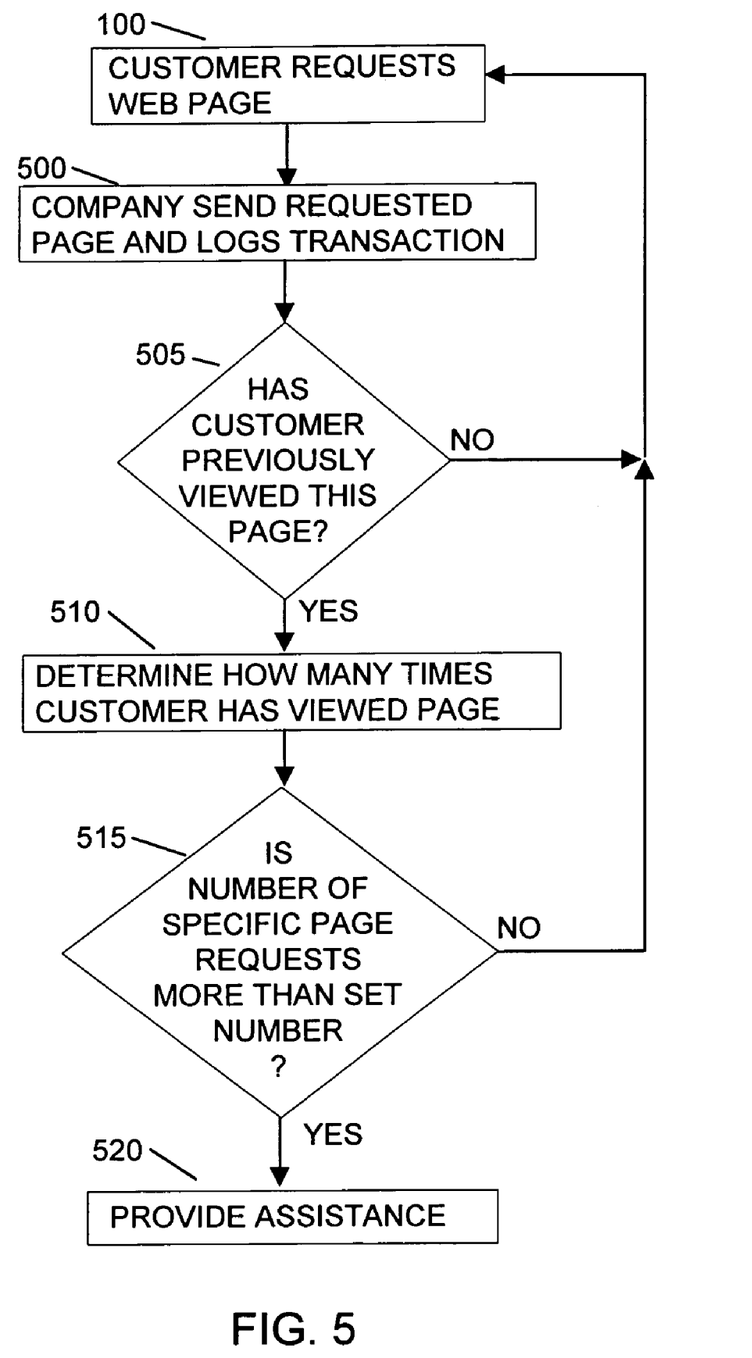
FIG. 5 illustrates a method of determining whether a customer needs assistance based upon the number of times a customer returns to a particular web page on the company's web site.

FIG. 5 illustrates a method of determining whether a customer needs assistance based upon the number of times a customer returns to a particular web page on the company's web site. If a customer is having trouble finding information, then the customer will often repeatedly return to the same web page or continue to re-enter certain fields or click on certain web page areas, such as the home or main web page for the company, or the main web page for a particular class of items, such as computers.

At step 100, the customer requests a web page from the company server. The company sends the requested page and logs the web page sent at step 500. At step 505, the server then checks its records to determine if this page has been previously sent to the customer during this session. Alternatively, a mini-application running on the customer's device may keep track of the pages previously sent and notify the company server when a particular page is repeatedly requested. If at step 505 the page has not been previously sent then the server waits for another page request from the customer.

If at step 505 the requested page has been previously sent, then at step 510 the server determines how many times the requested page has been sent. At step 515, the invention determines whether the customer has returned to the same web page or page area a predetermined number of times, such as "Y" times, for example, 5 times. This number is arbitrary. Further, Y may be a variable that can be adjusted based on real time analysis and dynamic calculations as well as the goals of the company, or based upon the complexity of the page, or based upon information about that particular customer's past actions at the web site. For example, some customers may go back and forth between two pages several times to make sure that they are entering the correct information.

However, if this number Y is too large, then the customer may give up in frustration before the "HELP" threshold is reached. If the number Y is too small, then the customer may be connected to a CSR when the customer is not having any problems, such as when the customer is merely browsing, or comparing two products or services, or the customer may be connected to the CSR before the customer has formulated in his or her mind exactly what product or service or information that the customer is looking for. Once the customer returns to a specific web page a predetermined number of times, the server provides assistance to the customer at step 520. If the number of page requests is not sufficient to warrant assistance, the server waits until the customer requests another web page.

Figure 6:
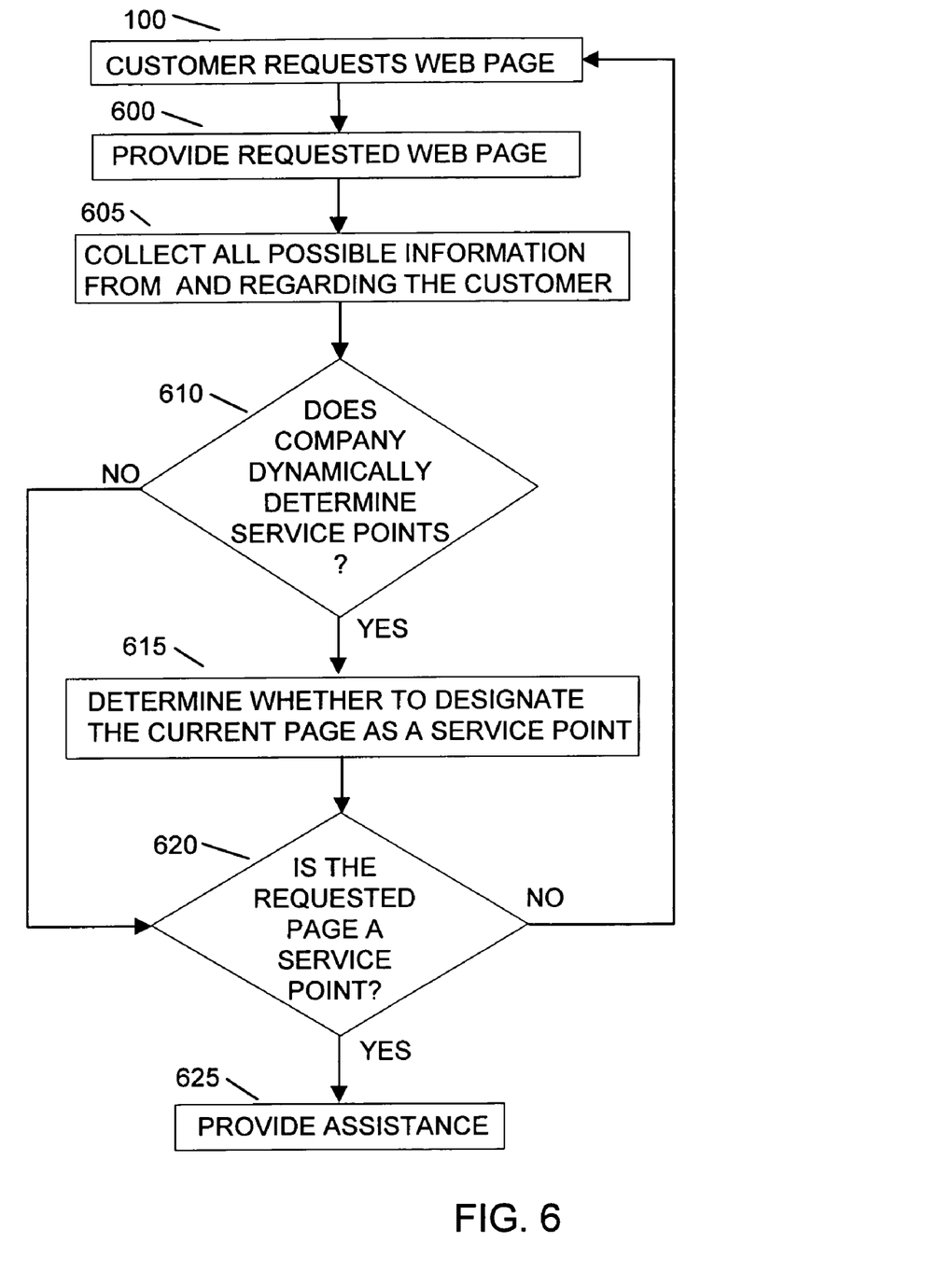
FIG. 6 illustrates a method of determining whether a customer needs assistance based upon abandon points.

FIG. 6 illustrates a method of determining whether a customer needs assistance based upon abandon points. The server automatically tracks when, where, and, if possible, why a customer leaves the web site. The page from which a customer leaves is the "abandon" point. An analysis of past customer practices is used to generate statistics regarding the probability of abandonment at specific pages. For example, the company web site may lead a customer down a particular virtual path to purchase a product but it is found that X % of customers abandon at the order page. If X % is too high of an abandonment rate, the company may decide to designate this page as a service point and provide customer service to every customer who visits that particular page.

At step 100, the customer requests a web page from the company server. At step 600 the server provides the requested page and, at step 605, collects all available information regarding the customer, such as personal information, products of concern, the time spent on particular pages, past transactions, and the customer profile. If the server dynamically determines service points, step 610, then, at step 615, the server determines whether or not to designate the current page as a service point. This dynamic determination may be based on, for example, the results of the last X visits to that page, or the results of the visits to that page in the last Y time. Then step 620 is executed.

If, at step 610, the server does not dynamically determine service points, then step 620 is executed.

Decision 620 tests whether the requested page is a service point. If so, then assistance is offered or provided at step 625. If the current page is not a service point, then the invention waits for the next request from the customer for a web page.

Two or more of the above described methods for determining whether or not to provide assistance may be combined. For example, specific customer information maintained on cookies or the company server may be used with the abandon point statistics to offer specific customers assistance at a particular web page.

Figure 7:
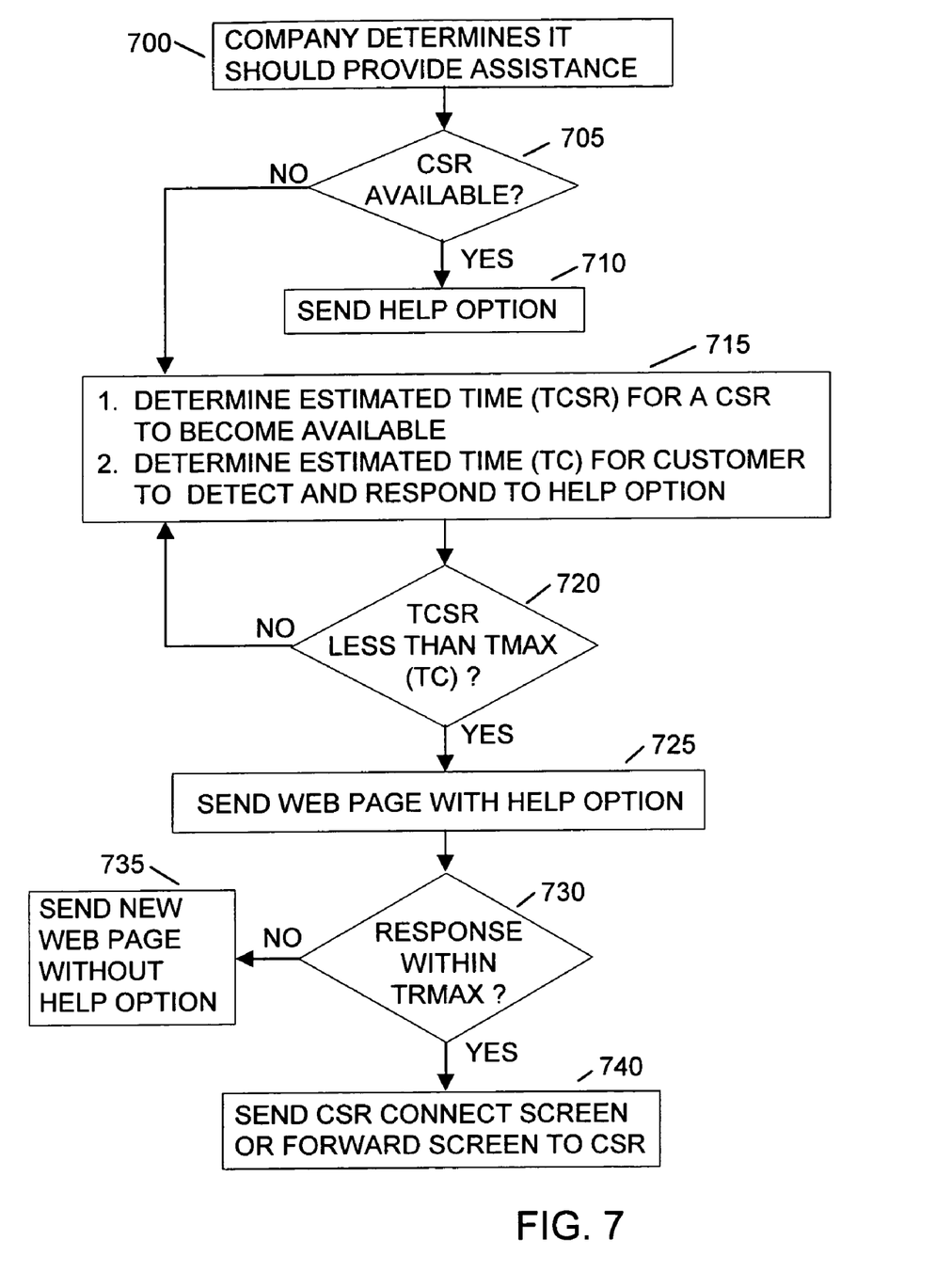
FIG. 7 illustrates the process of providing assistance once it has been determined that it is appropriate to provide assistance.

FIG. 7 illustrates the process of providing assistance once it has been determined that it is appropriate to provide assistance. Step 700 determines whether assistance should be provided, such as by using one or more of the methods described above. Assuming that a decision has been made that the customer requires assistance, step 705 determines whether a CSR is currently available. If a CSR is currently available then, at step 710, the company web server inserts a HELP option in the current page, sends a new web page with a HELP option, or updates the current web page but adds a HELP option. A HELP option may be a HELP button, or may be a HELP screen which connects the customer directly with an available CSR. A HELP button may be a "button", a key, an icon, a symbol, a word, a combination of words, a field, a sound or video clip, a multi-media presentation, or any desired combination thereof, so long as it indicates to the customer that the customer should take some action to obtain assistance. In one embodiment the HELP button provides a hyperlink to a predetermined web site address at the company server. The customer can then press or click on the HELP button to be connected on screen with the CSR, or the customer can begin typing a message on screen to the CSR. The customer is therefore immediately and directly connected to a CSR. This can happen because, prior to offering assistance to the customer, a determination has already been made that a CSR is available, predicted to be available, or will be available by the time that the customer responds.

The HELP screen presented at step 710 to the customer preferably includes a short explanatory or greeting message. For example, the HELP screen may present the message: "We have noticed that you have been at this same web page for some time. Do you require assistance? If so, please type in your question or the problem you are having and you will be immediately be connected on-screen with a Customer Service Representative." Or the screen may present the message: "We have noticed that you have returned to this same web page several times. Do you require assistance? If so, please type in your question or the problem you are having and you will be immediately be connected on-screen with a Customer Service Representative." The HELP option may be a video or audio clip to which the customer may respond orally or by clicking in an appropriate place. The help screen may address the customer by name through the use of the information stored on cookies or at the company server. These messages are exemplary and other appropriate messages may be used that may be based on the contact strategy or marketing campaign associated with the web page. Also, the HELP screen may be a completely new screen, or may be the existing web page with a HELP section superimposed, such as on the bottom third of the web page.

Once the CSR has assisted the customer, the CSR may press a release button on the computing device of the CSR and the CSR is then available for assisting another or an additional customer. It should be noted that a single agent may be able to service multiple customers simultaneously. In another embodiment, pressing the HELP button activates an executable code, sent with the HELP button, which causes a predetermined image to appear on the customer's screen, the predetermined image preferably including messages or information as described above.

A HELP screen optionally includes a "CANCEL" button (not shown), so that the customer can make the HELP screen disappear and the previous screen reappear if the customer does not want HELP, such as when the HELP button appeared because the customer had been on that web page for a long time due not to the customer studying the web page for that long, but due to the customer being away from the computing device.

Also, once the CSR has assisted the customer, several options are available. In one embodiment the last screen, with the communication between the customer and the CSR, may remain present so that the customer can review it, take notes, and/or save it. In another embodiment, the customer is returned to the web page that the customer was looking at before the customer-CSR communication began. In still another embodiment, the customer may be sent a new web page as selected by the CSR based upon the communications with the customer. Alternatively, the customer may be sent, via e-mail, chat, instant message, fax, or other media a transcript and the company may maintain a transcript for future reference.

If, at step 705, a CSR is not available, then step 715 is executed. Steps 715 and 720 act to enable the HELP option feature if a CSR is predicted to be available within a predetermined amount of time. This avoids the situation of the HELP option being activated when a CSR is not quickly available to help the customer.

In step 715 a determination is made as to the estimated time (TCSR) for a CSR to become available. When a CSR is assisting a customer the assistance time is measured. The assistance time is preferably measured for each CSR and each issue addressed and is used to generate a statistical database. If desired, assistance time measurements outside of a predetermined range may be discarded. This database is used to generate an average, or estimated, assistance time for each CSR. The estimated assistance time may also be issue dependent based on such things as the web page for which the customer needs assistance, the products involved, the customer involved, etc. This estimated assistance time is then compared, for each CSR, with the actual time that the CSR has already been assisting a customer. The difference is the estimated time (TCSR) before the CSR becomes available. Preferably, statistics and the TCSR are generated independently for each CSR and may be issue dependent. However, in another embodiment, the statistics for all CSRs are combined to produce a global TCSR.

Step 720 determines whether the TCSR is less than TMAX. If not, then step 715 is repeated. If, at step 720, TCSR is less than TMAX, then step 725 is executed. TMAX may be a fixed time or a variable time. In one embodiment, TMAX is fixed, for example, 5 seconds. In another embodiment TMAX is variable. If TMAX is variable, then step 715 preferably also includes a determination as to the estimated time (TC) for the customer to detect and respond to the HELP option, such as by pressing a HELP button or typing a question and sending back a HELP screen or HELP e-mail message. Once a HELP button or customer-CSR communication HELP screen is sent to the customer, the elapsed time is measured. The elapsed time is the time between the time that the HELP option is sent to the customer and the time that the customer responds to the HELP option by pressing the HELP button or sending a communication to the CSR. This elapsed time is preferably measured for each customer and is used to generate a statistical database. If desired, elapsed time measurements outside of a predetermined range may be discarded. This database is used to generate an average, or estimated, elapsed time which is used as the estimated time TC. In this case, TC is used for the time TMAX. Of course, this elapsed time will be different depending upon whether a HELP button is sent or a HELP screen is sent so, if TMAX is fixed, the type of HELP option sent should be considered in setting the time for TMAX.

TMAX may also be affected by "hold" information available to send to the customer. If the company has "hold" information and chooses to send such information, TMAX may be enlarged to the time that the "hold" information keeps the attention of the customer. The "hold" information may be a presentation (flash, power point, multimedia, etc.) sent to the customer that provides additional information to the customer regarding the company or the products at issue. This "hold" information may keep the customer busy for another X amount of time that is then used to determine TMAX. Furthermore, the "hold" information may include the opportunity for the customer to input information that is then used by the company to ease and expedite the assistance provided. For example, the "hold" information may include a request for the customer's identification code or specific area of interest. The information obtained may then be used to deliver a targeted presentation to the customer and may be used by the CSR to provide enhanced and more personalized service. Obtaining this information during the "hold" time is similar to the existing use of Interactive Voice Response (IVR) systems on telephone systems.

At step 725, the company server sends, to the customer, a HELP insertion for the existing page, a new web page with a HELP option, or refreshes the existing web page but adds a HELP option. The customer can then respond to the HELP option, such as by pressing the HELP button, if such is provided, and be connected via a communications screen to an available CSR, or by completing and returning the HELP screen, if such is provided. Similarly, the customer's response may be over any of many media such as, but not limited to e-mail, instant message, VoIP, voice over PSTN, etc.

At step 730 TC is measured for the customer to whom the HELP option was sent. If the customer responds to the HELP option within a predetermined elapsed time (TRMAX) then the customer is connected to an available (or the next available) CSR. If the customer does not respond to the HELP option within a predetermined elapsed time(TRMAX) then, in step 735, the HELP option is optionally removed by withdrawing the inserted HELP option, sending to the customer, a new web page without the HELP option, or refreshing the existing web page but removing the HELP option. This limits the number of outstanding HELP options so that the statistics described above remain valid and avoids the situation where more customers request help than the number of currently available CSRs or soon-to-be-available CSRs. TRMAX may be fixed or variable. In one embodiment, TRMAX is fixed and is 60 seconds. This fixed value for TRMAX is not critical but if it is too short then the HELP option will be removed before the customer has had a reasonable opportunity to notice the HELP option and decide to take advantage of it. Conversely, if it is too long then the situation may arise where more customers request help than the number of currently available CSRs or soon-to-be-available CSRs. In another embodiment, TRMAX is variable and is based upon statistics for previous customers, such as the estimated time TC described above. TC may be used for TRMAX without modification, or may be modified. For example, TRMAX may be based upon time TC supplemented by an additional fixed time, or TRMAX may be based upon the higher end of the curve for the TC statistics or based upon time of day/night that the transaction is taking place or many other such statistics. After step 735 as return is made to step 700.

If at step 730 the customer sends a timely response, the customer is connected to a CSR in step 740. If the HELP option is a HELP button, then a CSR communications screen web page is sent to the customer so that the customer can communicate directly with the CSR, as in step 710. If the HELP option is a HELP screen then the completed HELP screen is forwarded to an available CSR.

Additionally, in determining when to provide the HELP option, the invention may prioritize certain customers and the provision of assistance to those customers. Such customers would be VIP customers based on prior transactions or the significance of the transaction at hand. For these priority customers, the HELP option may be displayed for a longer period or a CSR may be held for offering immediate assistance. Thus, for the VIP customers the rules described above may be altered so that assistance can be provided more quickly, for a longer time, by the best available agent.

Figure 8:
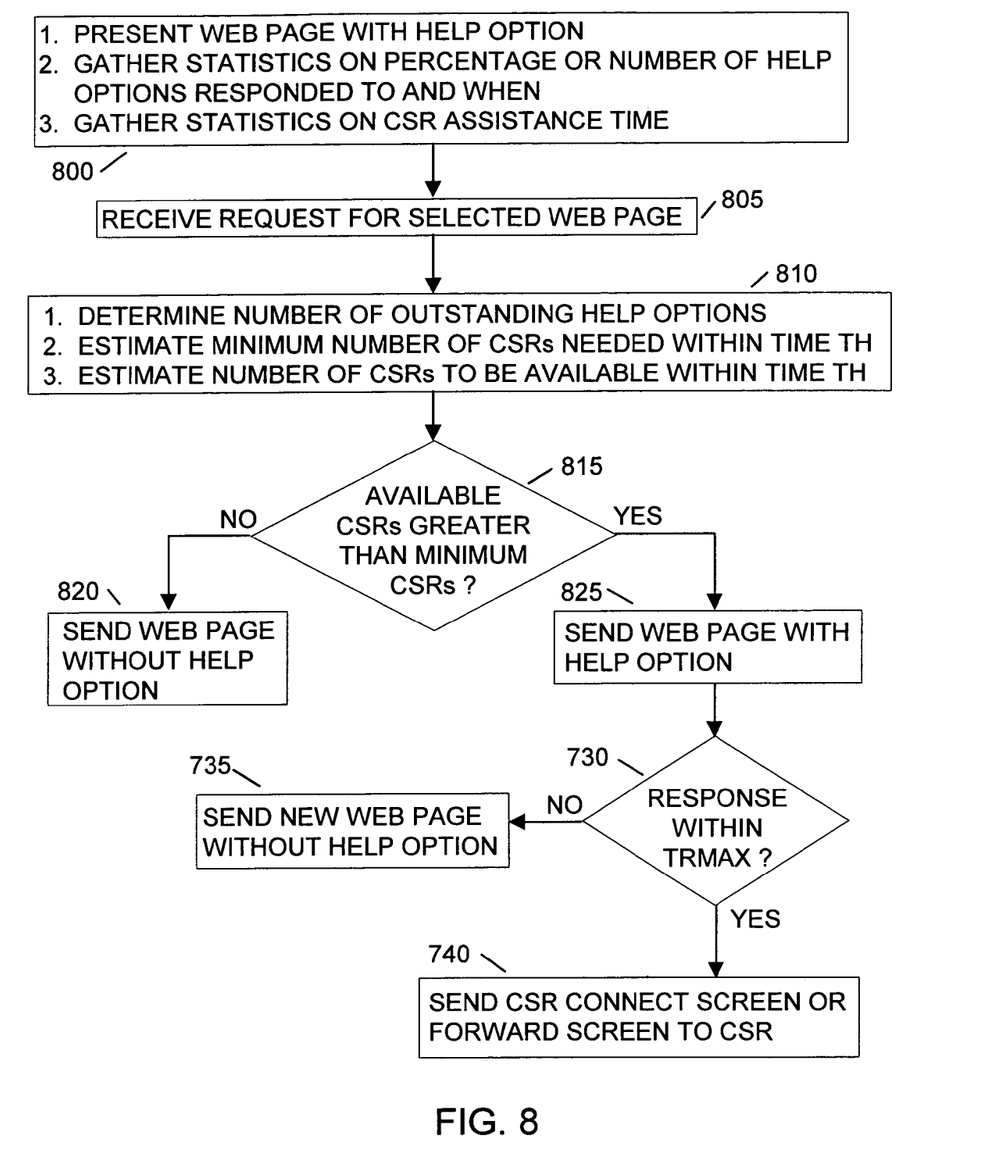
FIG. 8 illustrates another process of determining whether it is appropriate to provide assistance.

FIG. 8 illustrates another process of determining whether it is appropriate to provide assistance. In this embodiment a HELP option is presented based upon statistics of use of the HELP option and projected availability of a CSR.

In step 800, web pages are initially presented with a HELP option based on the determination that the customer needs assistance. Alternatively, web pages may be presented with a HELP option so as to quickly gather statistics. In another embodiment, a percentage of web pages are initially presented with a HELP option. In yet another embodiment, a predetermined number of web pages are initially presented with a HELP option. Some web pages are very simple or very brief, so not all web pages will have a HELP option. Statistics are gathered on the percentage of HELP options that are responded to, and when they are responded to. Additionally, statistics are gathered on the number of CSRs and the duration of the assistance times of the CSRs. Once adequate statistics have been gathered, then a sliding window is preferably used to maintain a representative recent sampling, for example, for the last 20 HELP options presented, or for the HELP options presented for the last ten minutes.

A customer then requests a predetermined web page or reaches a point where the invention determines it is appropriate to send HELP, as in step 805.

In step 810, the company web server determines the number of outstanding HELP options. Outstanding HELP options are those HELP options which have already been sent to the customer, and for which the customer is still on that web page, but for which the customer has not yet responded. The number of HELP options that will be responded to within a predetermined time TH is then estimated based upon the number of outstanding HELP options and on the HELP option statistics mentioned above. In addition, the number of CSRs that will become available within that time TH is estimated based upon the number of CSRs and the CSR statistics mentioned above.

In step 815, a determination is made as to whether the estimated number of available CSRs is greater than some minimum number of available CSRs. In the preferred embodiment this minimum number of available CSRs is the estimated number of HELP options that will be responded to within time TH. In an alternative embodiment, this minimum number is fixed. In another alternative embodiment, this minimum number has a fixed least value but may increase above that value based upon the estimated number of HELP options.

If the estimated number of available CSRs is not greater than the minimum number then, in step 820, the requested web page is sent without a HELP option. A return is then made to step 800 to continue gathering recent statistics.

If the estimated number of available CSRs is greater than the minimum number then, in step 825, the requested web page is sent with a HELP option. Following step 825, steps 730, 735, and 740, as in FIG. 7, are preferably executed.

After steps 730, 735, and 740, a return is then made to step 800 to continue gathering recent statistics.

In addition to the methods described above, it is also possible to add a self-help option based upon where the user is on the web page. This is similar to a frequently asked question (FAQ) but the help or FAQs offered are not the long list of FAQs offered at most sites, but are FAQs directed to the particular page or field being completed or indicated. Thus, the customer is provided FAQs which are directly related to the point of concern or interest. There may be a pull down menu option at that point, or a pop-up message, or some other option, which provides the user with the option of viewing the FAQs or communicating with a CSR.

Further, when an abandon point is reached, the FAQ option or list may be automatically brought up or offered, or the assistance of a CSR offered. Thus, the customer is provided the option of assistance at precisely the point when a customer might decide to quit.

Combinations of the various methods described above may also be used. For example, the HELP option may be generally presented based upon the statistics of FIG. 8, while monitoring individual customers as in FIGS. 1–6. Or, the HELP option may be generally presented based upon the individual customers as in FIGS. 1–6, but may be presented based upon the statistics of FIG. 8 if an excessive number of CSRs becomes available. Which process is the dominant process may be also based upon the number of available CSRs, or the number of outstanding HELP options, or the percentage of the use of the HELP options, etc. For example, if the use of the HELP options is initially low, then the HELP options may be presented based on the process of FIG. 8 but then, if the use increases above some predetermined percentage, the process of FIGS. 1–6 may take control until the use decreases.

Although a particular method of estimating parameters such as TC and TCSR has been described, other methods are also available, such as the various methods and algorithms used for predictive dialing. CSR availability can be predicted/calculated based on where they are the current transaction(s) (web page, work being done, etc), average number of helps per 15 minute periods, number of web pages handled over a period of time, etc. Therefore, the operation of the present invention is not limited to the disclosed method of estimating parameters.

It should be appreciated that the contact media illustrate explicitly herein is the text messages over the Internet, but any contact media could be used. The contact media can be voice over the Public-Switched Telephone Network (PSTN), voice over Internet Protocal (VoIP), image and sound video delivered over the Internet, or any other similar live response available. In such cases, the methods illustrated above would be unchanged except that with voice and multimedia contact the customer will be less likely to ignore the assistance offered so that there will be a higher hit rate when assistance is offered. The contact media employed may be based on the Customer Sensitivity® Profile maintained by the company on the server or in cookies pursuant to the invention described in U.S. Pat. No. 5,594,791 assigned to Inventions, Inc.

Thus, the present invention provides for a dynamic HELP option, which is presented based upon the activity of the web site and the activity of the customers. Variations of the present invention may occur to those reading this disclosure without departing from the spirit of the present invention. This invention is intended to cover all the different variations of the methods to determine when to provide assistance. Furthermore, the illustrated methods are not intended to limit how the determination to provide assistance is completed. Accordingly, the scope of the present invention is to be limited only by the claims.

We claim:

1. A method for providing assistance to a customer at a web site, comprising the steps of: receiving a request for a web page from a customer; sending said web page without a HELP option to said customer; automatically determining if said customer should be provided assistance; determining an estimated time before a customer service representative will be available, and if said estimated time exceeds a predetermined time then delaying a step of sending said HELP option to said customer until said estimated time does not exceed said predetermined time then sending said HELP option to said customer; and wherein said predetermined time is determined based upon measurements of the time between the time that a HELP option is sent to a previous customer and the time that said previous customer responds to said HELP option.

2. The method of claim 1 wherein said step of automatically determining if said customer should be provided assistance comprises: reviewing a saved customer profile; and if the profile indicates assistance should be provided then determining that said customer should be provided assistance.

3. The method of claim 1 wherein said step of automatically determining if said customer should be provided assistance comprises: measuring the time that said customer spends on said web page; and if said time exceeds a predetermined time then determining that said customer should be provided assistance.

4. The method of claim 1 wherein said step of automatically determining if said customer should be provided assistance comprises: measuring the time that said customer spends on an area or field within said web page; and if said time exceeds a predetermined time then determining that said customer should be provided assistance.

5. The method of claim 1 wherein: said step of automatically determining if said customer should be provided assistance comprises measuring the time that said customer spends on said web page, and if said time exceeds a predetermined time then determining that said customer should be provided assistance; and said step of sending said web page comprises sending a heartbeat to a customer with said web page, said heartbeat periodically sending a message to said web site.

6. The method of claim 1 wherein: said step of automatically determining if said customer should be provided assistance comprises measuring the time that said customer spends on said web page, and if said time exceeds a predetermined time then determining that said customer should be provided assistance; said step of sending said web page comprises sending a heartbeat to a customer with said web page, said heartbeat periodically sending a message to said web site; and said step of measuring the time comprises counting the number of said messages.

7. The method of claim 1 wherein: said step of automatically determining if said customer should be provided assistance comprises measuring the time that said customer spends on said web page, and if said time exceeds a predetermined time then determining that said customer should be provided assistance; said step of sending said web page comprises sending a heartbeat to a customer with said web page, said heartbeat periodically sending a message to said web site; said step of measuring the time comprises counting the number of said messages; and said step of determining if said time exceeds said predetermined time comprises comparing said number of messages with a predetermined number of messages.

8. The method of claim 1 wherein said step of automatically determining if said customer should be provided assistance comprises: reviewing electronic forms with entries from the customer; and if there are errors of significance in the electronic forms then determining that said customer should be provided assistance.

9. The method of claim 1 wherein said step of automatically determining if said customer should be provided assistance comprises: counting the number of times that a customer returns to said web page; and if said number exceeds a predetermined number then determining that said customer should be provided assistance.

10. The method of claim 1 wherein said step of automatically determining if said customer should be provided assistance comprises: determining if customer is at a service point; and if said customer is at a service point, then determining that said customer should be provided assistance.

11. The method of claim 1 wherein said step of sending said HELP option to said customer comprises sending a new web page to said customer, said new web page comprising said HELP option.

12. The method of claim 1 wherein said step of sending said HELP option to said customer comprises inserting a HELP option in the web page being viewed by the customer.

13. The method of claim 1, and further comprising: measuring the time since said HELP option was sent to said customer; if said time since said HELP option was sent has exceeded a predetermined response time without a response from said customer, then removing the HELP option or sending another web page to said customer, said another web page not having said HELP option.

14. The method of claim 13, wherein said predetermined response time is determined based upon measurements of the time between the time that a HELP option is sent to a previous customer and the time that said previous customer responds to said HELP option.

15. The method of claim 1 wherein said HELP option is a HELP button.

16. The method of claim 1 wherein said HELP option is a HELP screen.

17. The method of claim 1 wherein said HELP option is a audio message.

18. The method of claim 1 wherein said HELP option is a video message.

19. A method for providing assistance to a customer at a web site, comprising the steps of: receiving a request for a web page from a customer; determining whether a customer service representative is available; if a said customer service representative is available then sending said web page to said customer with a HELP option on said web page and if said customer service representative is not available then determining an estimated time before a customer service representative will be available, and if said estimated time is less than a predetermined time then sending said web page to said customer with a HELP option on said web page; wherein said predetermined time is determined based upon measurements of multiple incidences of time between the time that a HELP option is sent to a previous customer and the time that said previous customer responds to said HELP option.

20. The method of claim 19, and further comprising: measuring the time since said HELP option was sent to said customer; if said time since said HELP option was sent has exceeded a predetermined response time without a response from said customer, then sending another web page to said customer, said another web page not having said HELP option.

21. The method of claim 19, and further comprising: measuring the time since said HELP option was sent to said customer, if said time since said HELP option was sent has exceeded a predetermined response time without a response from said customer, then sending another web page to said customer, said another web page not having said HELP option; wherein said predetermined response time is determined based upon measurements of the time between the time that a HELP option is sent to a previous customer and the time that said previous customer responds to said HELP option.

22. The method of claim 19 wherein said HELP option is a HELP button.

23. The method of claim 19 wherein said HELP option is a HELP screen.

24. The method of claim 19 wherein said HELP option is a audio message.

25. The method of claim 19 wherein said HELP option is a video message.

26. A method for providing assistance to a customer at a web site, comprising the steps of: receiving a request for a web page from a customer; determining whether a customer service representative is available; determining an estimated time before a customer service representative will be available; if said estimated time is less than a predetermined time then sending said web page to said customer with a HELP option on said web page; wherein said predetermined time is determined based upon measurements of the time between the time that a HELP option is sent previous customer and the time that said previous customer responds to said HELP option.

27. The method of claim 26, and further comprising: measuring the time since said HELP option was sent to said customer, if said time since said HELP option was sent has exceeded a predetermined response time without a response from said customer, then sending another web page to said customer, said another web page not having said HELP option; wherein said predetermined response time is determined based upon measurements of the time between the time that a HELP option is sent to a previous customer and the time that said previous customer responds to said HELP option.

28. The method of claim 26 wherein said HELP option is a HELP button.

29. The method of claim 26 wherein said HELP option is a HELP screen.

30. The method of claim 26 wherein said HELP option is a audio message.

31. The method of claim 26 wherein said HELP option is a video message.

* * * * *